Figure 1:
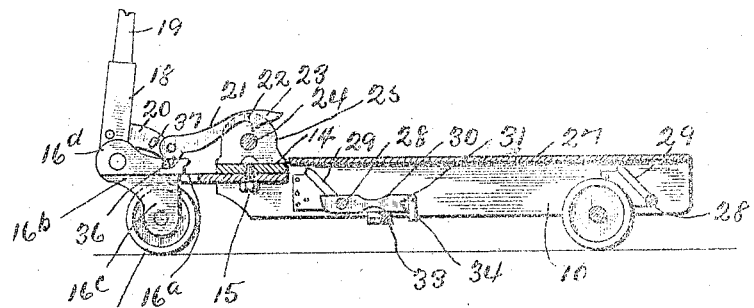

C. E. M. MILLER.
LIFTING TRUCK.
APPLICATION FILED OCT. 17, 1913.

1,104,533.

Patented July 21, 1914
2 SHEETS—SHEET 1.

Witnesses:

Carl E. M. Miller, Inventor.
By his Attorney

UNITED STATES PATENT OFFICE.

CARL E. M. MILLER, OF NEW YORK, N. Y.

LIFTING-TRUCK.

1,104,533.  Specification of Letters Patent.  Patented July 21, 1914.

Application filed October 17, 1913. Serial No. 795,640.

*To all whom it may concern:*

Be it known that I, CARL E. M. MILLER, of the city, county, and State of New York, have invented a new and useful Improvement in Lifting-Trucks, of which the following is the full, clear, and exact description.

My invention relates to improvements in that class of trucks known as lifting trucks, in which the truck can be wheeled under a load and then by the action of the handle, raised so as to lift the load from the floor and thus hold it in position to be transported to a desired place.

The object of my invention is to simplify the construction of trucks of this class, render the truck easier to operate, construct it so that it can be turned more readily, and to provide a simplified and positive means for locking the truck in its raised position, for releasing the lifted member of the truck, and for freeing the locking mechanism so that the truck can be backed or pulled forward or handled easily and effectively.

Reference is to be had to the accompanying drawings forming a part of this specification, in which similar reference characters indicate corresponding parts in all the views.

Figure 2:
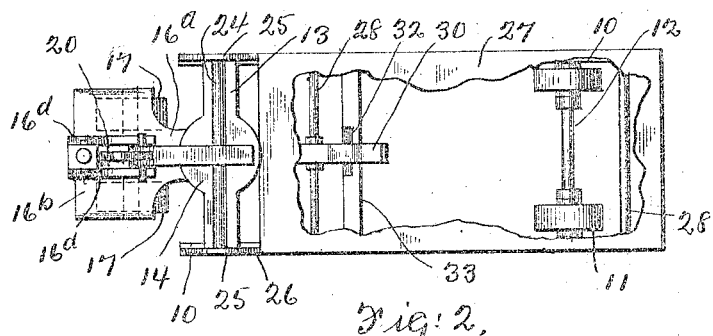
Figure 3:
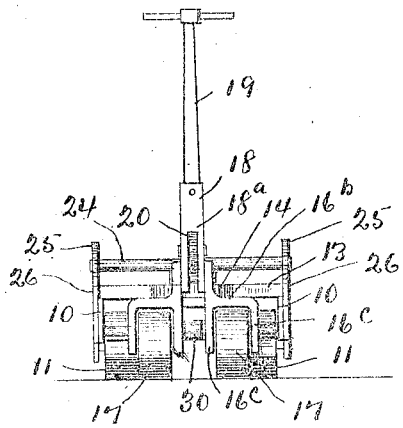
Figure 4:
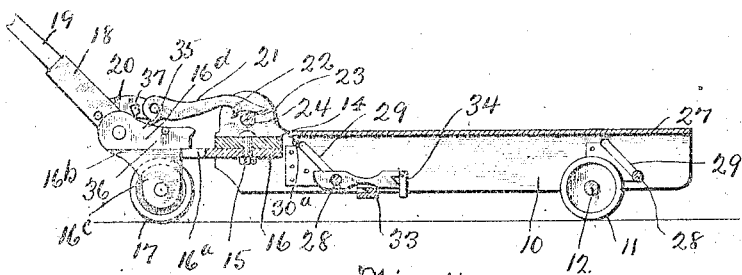
Figure 5:
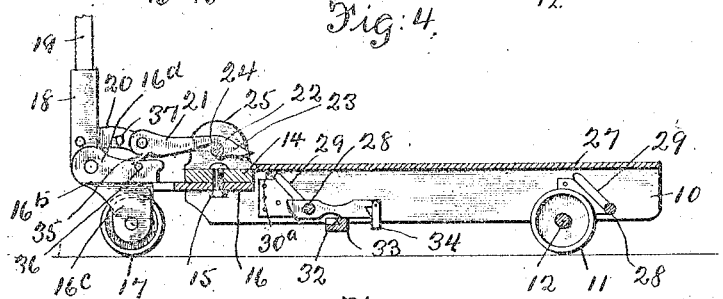
Figure 6:
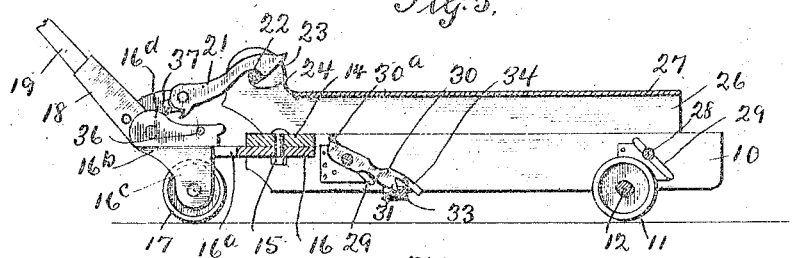
Figure 7:
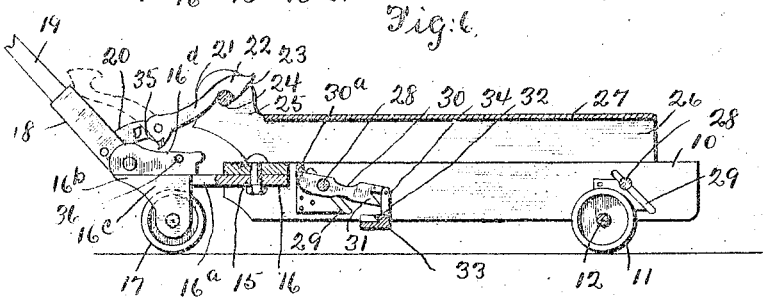

Figure 1 is a longitudinal section of the truck in its unraised position. Fig. 2 is a broken plan view of the truck. Fig. 3 is a front end view. Fig. 4 is a longitudinal section showing the position of the lifting hook just before its lifting engagement. Fig. 5 is a view similar to Fig. 4, but with the lifting hook in engagement with its cross bar so as to pull the upper member of the frame forward and upward. Fig. 6 is a view similar to Fig. 5 but with the handle thrown forward and the outer and upper member of the truck raised, this view showing also the position of the locking arm which holds the truck in raised position, and Fig. 7 is a view similar to Fig. 6 but showing the upper frame pulled forward slightly further so as to release the locking arm and permit the upper member of the truck frame to be lowered.

The truck has the usual frame 10 which is of generally rectangular shape, and the rear end of which is mounted on wheels 11 which run on the axle 12 as usual. At the front end of the frame and on the upper part, is a cross-bar 13 which is widened at the center (see Fig. 2) so as to form the base 14 of the fifth wheel for the forward truck wheels, and to the under side of the member 14 is pivoted by means of a bolt 15 or its equivalent, the fifth wheel or plate 16 which turns on the bolt, and which has a forwardly extending part 16ª merging in the brackets 16ᵇ (see Fig. 3) which are arranged in pairs and have depending arms or members 16ᶜ, in which the forward wheels 17 of the truck are journaled.

The brackets 16ᵇ have upwardly extending parallel ears 16ᵈ between which is pivoted the socket member 18 of the handle 19, which is inserted in the socket, and by which the truck is moved and actuated. The socket member 18 of the handle is preferably split, as shown at 18ª in Fig. 3, and in this is pivoted a short rearwardly extending link 20 which is in turn pivoted to the shank 21 of the hook 22 which has a flat extension 23 adapted to rest on the cross bar 24 when the hook is about to engage or has just disengaged itself from the cross-bar, as shown in Fig. 4. The cross-bar 24 is supported in the ears 25 which project upward from the outer or top frame 26 of the truck, this frame being shown best in Figs. 6 and 7. The top frame corresponds in shape to the lower frame 10, and is provided with a suitable top 27, so that articles can be conveniently carried on it.

The outer and upper frame is provided near its front and rear ends with cross rods 28 which move in inclined cam grooves 29 in the sides of the lower frame 10, as shown in the several views, so that when the outer frame 26 is pulled forward, the cross rods 28 will slide upon the walls of the slots 29, and the outer member will therefore be raised. There is nothing new about this arrangement.

When the frame 26 is raised to the position shown in Fig. 6, it is locked in its raised position by the locking arm 30 which is pivoted on the forward rod 28, and which is provided with a shoulder 31 adapted to drop by gravity into engagement with a shoulder 32 on the cross-bar 33 which is secured to the stationary frame 10. This is shown in Fig. 6. The arm 30 is also provided at its extreme rear end with a pivoted free pawl 34 which when the arm is pulled forward as presently described, will ride on the cross-bar 33 as shown in Fig. 7, so that the upper member can then slide back to its lowest position and release its load.

To provide for freeing the hook 22, the shank 21 of the hook is provided near its front end and just below its pivot, with a barb 35 which is adapted to engage a pin 36 between the ears 16ᵈ, as in Fig. 1, so that by pulling the handle forward, the barb will engage the pin and tilt the shank 21 so as to release the hook 22 from the rod 24. The link 20 is also provided with an abutment 37 which when the hook 21 is freed and allowed to swing downward and rearward, engages the said hook and prevents it from swinging too far rearward.

In using the truck, it is pushed beneath the load to be raised and transported, and if the handle is lifted slightly, the part 23 will ride on the cross-rod 24 as in Fig. 4, then if the handle is swung back a little farther, the hook 23 drops into engagement with the cross rod 24 as in Fig. 5. The handle 19 is then pulled forward, and this pulls forward the frame 26, and by reason of the rods 28 and the cam slots 29, the outer frame 26 is elevated as in Fig. 6, and the locking arm 30 drops into engagement with the shoulder 32, as already described, and as shown in Fig. 6. If, now, the handle 19 is swung slightly further back, the barb 35 engages the pin 36, and when the handle is again moved forward so as to enable it to be used in hauling the truck, the hook 21 is swung back to the position shown by dotted lines in Fig. 7. When the load is to be released and the outer member lowered, the hook 22 is placed in engagement with the cross-rod 24, and the frame 26 is then pulled forward slightly by tilting the handle 19, and this brings the forward end of the arm 30 beneath the pin 30* on the frame 10, as shown in Fig. 7, so that the further forward movement of the frame 26 tilts the arm 30, raises the shoulder 31 from the shoulder 32 of the cross-bar 33, and permits the pawl 34 to ride on the cross-bar as in Fig. 7, then the frame 26 will slide back by gravity as permitted by the handle 19.

From the foregoing description it will be seen that I have designed a very simple and efficient lifting truck, that the front wheels can be released automatically so as to turn freely by means of the truck handle, and that the whole affair can be cheaply made and easily operated.

I claim:—

1. A lifting truck comprising a lower frame mounted on wheels, a pivoted extension projecting forward from the lower frame and also mounted on wheels, a vertically swinging handle on the extension, a second frame connected with the lower frame so that when pulled forward it will rise on the lower frame, a hook and link connection between the second or movable frame and the handle, and means for releasing the hook by a movement of the handle.

2. A lifting truck comprising a lower frame mounted on wheels and provided with a pivoted forward extension also mounted on wheels, a second frame riding on the lower frame and adapted when pulled forward to rise on the lower frame, a pivoted handle on the forward extension, a pivoted hook carried by the handle, a cross-rod on the upper frame adapted to engage the hook, and means actuated by the movement of the handle for releasing the hook from the cross-bar.

3. A lifting truck comprising a frame mounted on wheels and provided with a pivoted forward extension also mounted on wheels, a second frame riding on the lower frame and adapted when pulled forward to rise on the lower frame, a cross bar on the forward part of the upper frame, a swinging handle pivoted in the forward extension, a hook pivotally connected with the handle and adapted to engage the aforesaid cross-rod, and means as a barb on the hook and a pin on the forward extension for releasing the hook by the swinging of the handle.

4. A lifting truck comprising a lower frame mounted on wheels and provided with a pivoted forward extension also mounted on wheels, an upper frame connected with the lower frame so that when pulled forward it will rise on the lower frame, a swinging handle on the pivoted extension, a connection between the handle and the upper frame by which the upper frame can be pulled forward by the swinging of the handle and means for releasing the connection between the upper frame and handle by a movement of the handle.

5. The combination of the lower and upper frames, the latter riding on the former, of means for raising the upper frame by pulling it forward on the lower frame, a pivoted arm carried by the upper frame and adapted to engage an abutment carried by the lower frame, and a pawl at the free end of the arm adapted to ride on the aforesaid abutment and release the arm from said abutment when the upper frame is pulled to a certain position.

6. The combination with the lower and upper frames, the latter riding on the former, of means for raising the upper frame by pulling it forward on the lower frame, a pivoted arm carried by the upper frame and adapted to engage an abutment carried by the lower frame, a pawl at the free end of the arm adapted to ride on the aforesaid abutment and release the arm from said abutment when the upper frame is pulled to a certain position, and means on the lower frame to engage and tilt the aforesaid arm when the upper frame is moved a predetermined distance.

CARL E. M. MILLER.

Witnesses:
  WARREN B. HUTCHINSON,
  M. G. O'DONNELL.